United States Patent [19]

Gay et al.

[11] Patent Number: 4,924,480

[45] Date of Patent: May 8, 1990

[54] CODECS WITH SUPPRESSION OF MULTIPLE ENCODING/DECODINGS ACROSS A CONNECTION

[75] Inventors: Steven L. Gay, Lincroft; Richard D. Gitlin, Little Silver; John Hartung, Marlboro, all of N.J.

[73] Assignee: American Telephone and Telegraph Company, New York, N.Y.

[21] Appl. No.: 166,867

[22] Filed: Mar. 11, 1988

[51] Int. Cl.$^5$ .............................................. H04L 3/00
[52] U.S. Cl. ......................................... 375/8; 341/50; 381/31
[58] Field of Search ............... 379/219, 225, 230, 242, 379/290, 308, 311, 353; 178/71 L, 2 B; 375/4, 8, 116, 106, 108; 381/29–40; 341/143, 50

[56] References Cited

U.S. PATENT DOCUMENTS

| | | | |
|---|---|---|---|
| 3,750,144 | 7/1973 | Bolus et al. | 375/106 |
| 3,761,610 | 9/1973 | Krallinger et al. | 381/29 |
| 4,001,693 | 1/1977 | Stackhouse et al. | 375/108 |
| 4,453,259 | 6/1984 | Miller | 375/106 |
| 4,513,415 | 4/1985 | Martinez | 379/290 |
| 4,663,766 | 5/1987 | Bremer | 375/106 |
| 4,723,272 | 2/1988 | Maat | 379/230 |
| 4,748,638 | 5/1988 | Friedman et al. | 381/31 |
| 4,751,736 | 6/1988 | Gupta et al. | 381/31 |

Primary Examiner—Gary V. Harkcom
Assistant Examiner—David D. Knepper
Attorney, Agent, or Firm—David Volejnicek; Ronald D. Slusky

[57] ABSTRACT

In a private telecommunications network, a plurality of digital PBXs are interconnected via pairs of codecs. The codecs of each pair, or "tandem", are each operative to encode 64 kilobit/second (kbps) mu-law speech so as to compress it to 16 kbps speech for transmission to the other codec in the tandem. The latter is operative to thereafter decompress the 16 kbps speech back to 64 kbps. Each codec has a second mode of operation in which, rather than decode the encoded speech, it preserves the bits thereof in its own output signal. The codec transitions to this mode whenever it recognizes the presence of another codec on its high-bit-rate side of the connection. As a result, only one encoding/decoding cycle is performed across the connection, thereby minimizing the speech-coding-induced distortion and delay therein. The mechanism enabling a codec to communicate its presence to another codec on its high-bit-rate side of the connection is based on the transmission of predetermined synchronization patterns inserted in the signals it outputs in that direction. In a second embodiment, codecs of the above-described type are used in a cellular mobile radio telecommunications system.

28 Claims, 6 Drawing Sheets

CODEC CONTROLLER
DECOMPRESSOR STATE DIAGRAM

CODEC CONTROLLER
COMPRESSOR STATE DIAGRAM

FIG. 6

SQ1G: PATTERN I HAS BEEN DETECTED WITH AN ACCEPTABLE NUMBER OF ERRORS FOR ONE OBSERVATION PERIOD.

$\overline{SQ1G}$: THE ABSENCE OF PATTERN I HAS BEEN DETECTED FOR ONE OBSERVATION PERIOD.

SQ2G: PATTERN II HAS BEEN DETECTED WITH AN ACCEPTABLE NUMBER OF ERRORS FOR ONE OBSERVATION PERIOD.

$\overline{SQ2G}$: THE ABSENCE OF PATTERN II HAS BEEN DETECTED FOR ONE OBSERVATION PERIOD.

SQ1GM: PATTERN I HAS BEEN DETECTED WITH AN ACCEPTABLE NUMBER OF ERRORS FOR M OBSERVATION PERIODS.

SQ1GN: PATTERN I HAS BEEN DETECTED WITH AN ACCEPTABLE NUMBER OF ERRORS FOR N OBSERVATION PERIODS.

CODECS WITH SUPPRESSION OF MULTIPLE ENCODING/DECODINGS ACROSS A CONNECTION

TECHNICAL FIELD

This invention relates to codecs used to transmit, for example, digital speech at reduced bit rates.

BACKGROUND OF THE INVENTION

As is well known, it is possible to save bandwidth, and thus reduce transmission costs, in digital telecommunications systems by using so-called speech coding. Such coding exploits redundancies in the speech signals to compress the signals from their original rate of (typically) 64 kilobits/second (kbps) to some lower rate prior to transmission. In current practice, for example, the most-widely used speech coding algorithm is adaptive differential pulse code modulation (ADPCM) which is used to compress 64 kbps speech to 32 kbps speech.

In the meantime, the past decade or so has seen considerable progress in the speech coding art to the point where it has been shown that the 64 kbps speech can be compressed to a rate as low as 2.4 kbps. Although these newer techniques have not found widespread commercial use as of yet, commercial interest therein has increased significantly in the last few years. One of the factors contributing to this increased level of commercial interest is the fact that today's speech compression algorithms are able to achieve greater levels of compression at more acceptable levels of distortion and signal delay than have been achieved in the past. Another such factor is the accelerating pace of the conversion of the installed base of telecommunications equipment and facilities, both in this country and around the world, from analog to digital technologies.

Inherent in virtually any speech coding algorithm is the loss of a certain amount of speech information. Thus the re-constituted signal arrived at upon performing the inverse, decoding, process is somewhat distorted relative to the original. It is also somewhat delayed relative thereto. In general, the level of this distortion and delay increases as the level of compression increases. Moreover, if a speech signal is subjected to two or more encoding/decoding cycles, each cycle adds its own measure of distortion and delay to the signal being processed.

This has not proved to be a problem with, for example, 64-to -32 kbps ADPCM coding of speech signals because the levels of distortion and delay introduced therein are quite small. On the other hand, most of the newer speech coding algorithms, when operated at, say, a 64-to-16 kbps level of compression, can withstand perhaps only one encoding/decoding cycle before noticeable, and therefore objectionable, distortion and/or delay occur. This is a significant limitation because, in many telecommunications environments, the connection established between two communicating endpoints may include two or more pairs, or "tandems," of encoder/decoders, or "codecs"—the units which actually carry out the speech encoding and decoding. This can happen, for example, when a connection set up within a private telecommunications network includes tow or more PBXs. It is also inherent in a mobile-station-to-mobile-station connection in a digital cellular radio system.

It thus appears that the extent to which the advantages afforded by the high-compression speech coding algorithms that have been developed in recent years can be exploited will hinge to a significant extent on the ability to minimize, or avoid, the distortion and delay which may be introduced when the speech signal is routed through two or more codec tandems.

SUMMARY OF THE INVENTION

We have recognized that what is needed in order to solve this problem is to provide each codec in a connection with the ability to recognize the presence of another codec on its high-bit-rate side of the connection without the need for intervention by, or interaction with, any intervening equipment, such as a PBX or other telecommunications switch, and without noticeably affecting the speech signals themselves. In accordance with the invention, a codec, upon recognizing the presence of another codec on its high-bit-rate side of a connection, switches from its conventional encoding/decoding mode of operation to a second mode of operation in which, rather than decode the encoded speech received from the codec on the other, low-bit-rate, side of the connection, it embeds the coded speech bits thereof in its output signal. As a result, only one encoding/decoding cycle is performed across the connection.

In preferred embodiments, each codec communicates its presence to another codec on its high-bit-rate side of the connection by way of one or more supervisory signals transmitted along with the other signals output by the codec on its high-bit-rate side of the connection. It may also be noted that even the relatively small levels of distortion introduced by 64-to-32 kbps ADPCM do have a significant distortive affect on voiceband data signals traversing the connection—an affect which, again, increases as the number of encoding/decoding cycles increases. The invention thus affords the further advantage of limiting the deterioration of bit error rate that otherwise occurs when voiceband data signals traverse multiple-codec-tandem telecommunications connections.

BRIEF DESCRIPTION OF THE DRAWING

In the drawing,

FIG. 6 is a table which sets forth the meanings of a number of mnemonics used in FIGS. 4 and 5.

DETAILED DESCRIPTION

Figure 1:
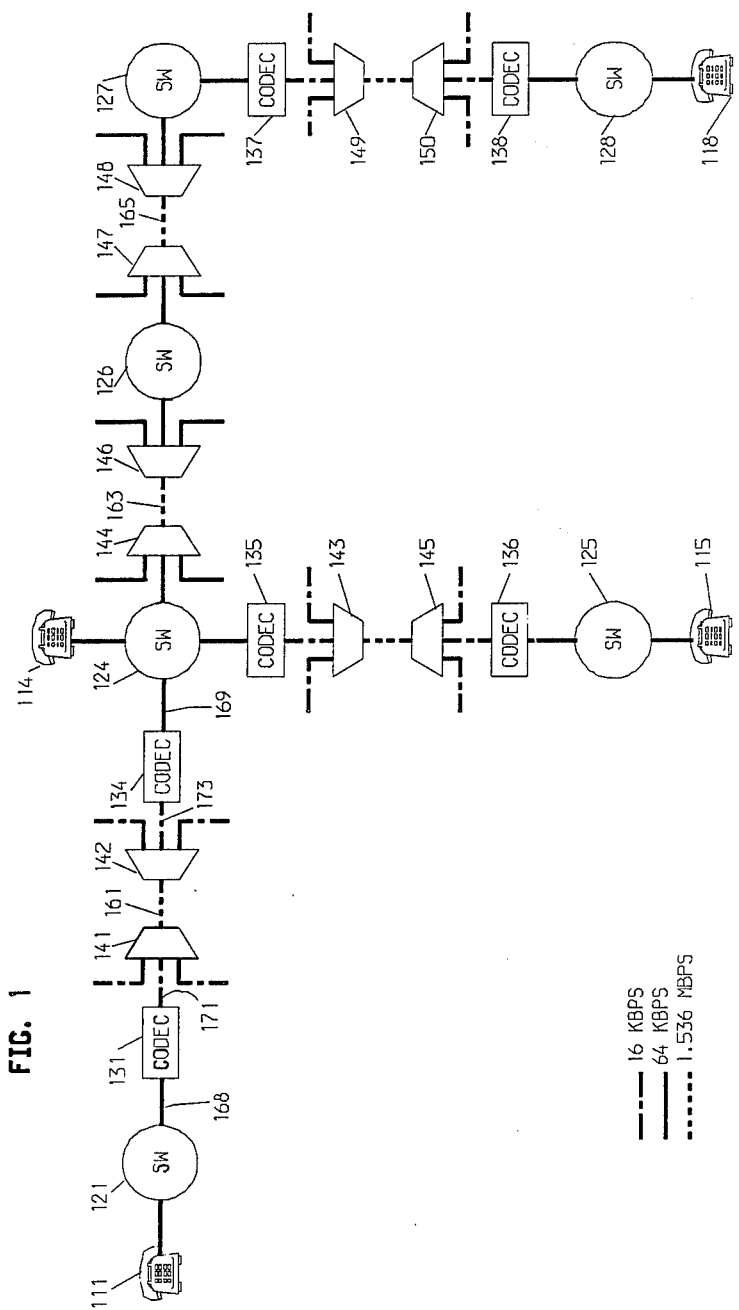
FIG. 1 depicts a private telecommunications network in which the present invention is illustratively implemented.

FIG. 1 depicts a private telecommunications network comprised of a plurality of digital telecommunications switches, illustratively PBXs 121, 124, 125, 126, 127 and 128. A number of telephone stations, each serving as a communication endpoint, are connected to each PBX. In particular, telephone stations 111, 114, 115 and 118, respectively connected to PBXs 121, 124, 125 and 128, are explicitly shown in the drawing.

Each of the aforementioned PBXs is illustratively a digital PBX such as the AT&T System 85 PBX. PBXs 121 and 124 are interconnected via a pair, or "tandem", of full-duplex encoder/decoders, or "codecs", 131 and 134 to which they are connection via two-directional paths 168 and 169, respectively. Codec 131 (134) takes a 64 kilobit/second (kbps) 8-bit-per-sample mu-law encoded digitized voice signal provided by PBX 121 (124) and further encodes the signal so as to compress it to a reduced rate of (illustratively) 16 kbps. The reduced rate signal, provided on path 171 (173), is combined with a number of—illustratively 95—other similarly encoded signals, by a multiplexer/demultiplexer (mux/demux) 141 (142) and is communicated over a telephone transmission facility, such as a so-called T1 link 161, to a mux/demux 142 (141) and thence to codec 134 (131) via path 173 (171). The latter decodes the received signal, thereby decompressing it back to 64 kbps, and the resulting 64 kbps signal is passed to PBX 124 (121).

PBXs 124 and 125 are similarly interconnected via path 174, codec 135, path 177, mux/demux 143, T1 link 164, mux/demux 145, path 166, codec 136, and path 168. Similarly, PBXs 127 and 128 are interconnected via codec 137, mux/demux 149, mux/demux 150, codec 138, and various paths (not numbered). In each case, the codecs, as above, encode to provide a 64-to-16 kbps compression of signals output by the PBX and decode to provide a 16-to-64 kbps decompression of signals input to the PBX.

Finally, PBXs 124 and 127 are interconnected via PBX 126, respective mux/demux pairs 144/146 and 147/148, T1 links 163 and 165 and, again, various paths not numbered.

The encoding performed by codecs in this type of arrangement is conventionally carried out via algorithms which reduce the bit rate of the speech intelligence being processed by removing redundancies therein. In the present embodiment, the technique known as subband coding is illustratively used to carry out the coding of speech although other techniques, such as multipulse-excited linear predictive coding, could alternatively be used. Disadvantageously, these algorithms inherently lose information in the encoding process. Thus the re-constituted intelligence arrived at upon performing the inverse, decoding process, is somewhat distorted relative to the original. Such distortion is exacerbated if the signal being processed is subjected to multiple cycles of encoding and decoding in the course of passing through multiple codec tandems. Indeed, subband coding, as well as most of the other known algorithms, when operated at this level of compression, can withstand perhaps only one encoding/decoding cycle before noticeable distortion occurs.

A further problem is that many speech coding algorithms, in order to exploit temporal redundancies in the speech signal, necessarily introduce delay into the encoded signal. Thus every encoding/decoding cycle adds a measure of delay to the signal being processed to the point that it may become objectionable to the listener.

Consider, then, a connection between telephone stations 111 and 115. This connection includes two codec tandems, 131/134 and 135/136, as compared, for example, to a connection between telephone stations 114 and 115 which would include only one codec tandem, i.e., 135/136. The problems outlined above with regard to multiple encoding/decoding cycles are thus a concern in the former case. (A similar situation obtains with respect to a connection between telephone stations 111 and 118 since that connection includes codec tandems 131/134 and 137/138.)

One might think that the solution to the problem of multiple encoding/decoding cycles would be simply a matter of eliminating codecs 134 and 135, thereby allowing the 16 kbps subband encoded speech generated by codec 131 to pass all the way to codec 136 without any intermediate speech processing. However, there is no ready mechanism for knowing at, for example, the output of mux/demux 142 whether a call that originated from telephone station 111 is destined for telephone station 115 or a station directly connected to switch 124, such as station 114, in which latter case codec 134 would be needed in the connection in order to provide the inverse processing of codec 131. Accordingly, codecs 134 and 135 cannot simply be done away with.

Alternatively, then, one might think of providing PBX 124 with the capability of controlling the mode of the codecs, i.e., controlling whether they are to operate in their normal encoding/decoding mode, on the one hand, or in a mode in which the encoded speech signals pass directly through them, on the other hand. This approach, although perhaps technically possible, is not a practical solution because the installed base of existing PBXs throughout this country would need to be retrofitted to incorporate such a capability. This would be a prohibitively costly undertaking.

In accordance with the invention, we have recognized that what is needed is to provide each codec with the ability to communicate its presence to a codec on its high-bit-rate side of the connection, e.g., the side of codec 134 (135) that communicates with switch 124, without the need for intervention by, or interaction with, the PBX and without noticeably affecting the speech signals themselves. In accordance with the invention, then, codec 134 (135), upon becoming aware of the presence on its high-bit-rate side of codec 135 (134) in a connection between, say, telephone stations 111 and 115, a) suspends its subband decoding and passes on to switch 124 and thence codec 135 (134) a signal in which the encoded signal received from codec 131 (136) is embedded and b) suspends its subband encoding and passes on to codec 131 (136) the encoded signal which is embedded in the signal received from codec 135 (134) by way of switch 124. In this way, the 16 kbps subband encoded speech generated by codec 131 (136) passes all the way to codec 136 (131) without any intermediate speech processing.

If, on the other hand, the connection through, say, codec 135 is between telephone stations 114 and 115, codec 135 will not detect the presence of another codec on its high-bit-rate side. It will, accordingly, operate in a subband coding mode. That is, it will subband decode the signal received from codec 136 and subband encode the signal received from telephone station 114 via PBX 124.

In the present illustrative embodiment, PBX 124 is of a type which requires its input signals to be at 64 kbps. In order to accommodate this requirement, codec 134 (135) when suspending its speech encoding/decoding in accordance with the invention does not simply pass along the low-rate, i.e., 16 kbps, subband encoded signal it receives from codec 131 (136). Rather, it "pads out" that low-rate signal to a 64 kbps signal by combining the 16 kbps subband encoded signal with "place-holder"

bits. After passing through PBX 124, the resulting 64 kbps "padded" signal, having embedded therein the subband encoded signal generated by codec 131 (136), is then subjected to a "stripping" operation in codec 135 (134) to "strip out" the place-holder bits from the padded signal, thereby re-creating the 16 kbps subband encoded stream that originated at codec 131 (136).

Figure 2:
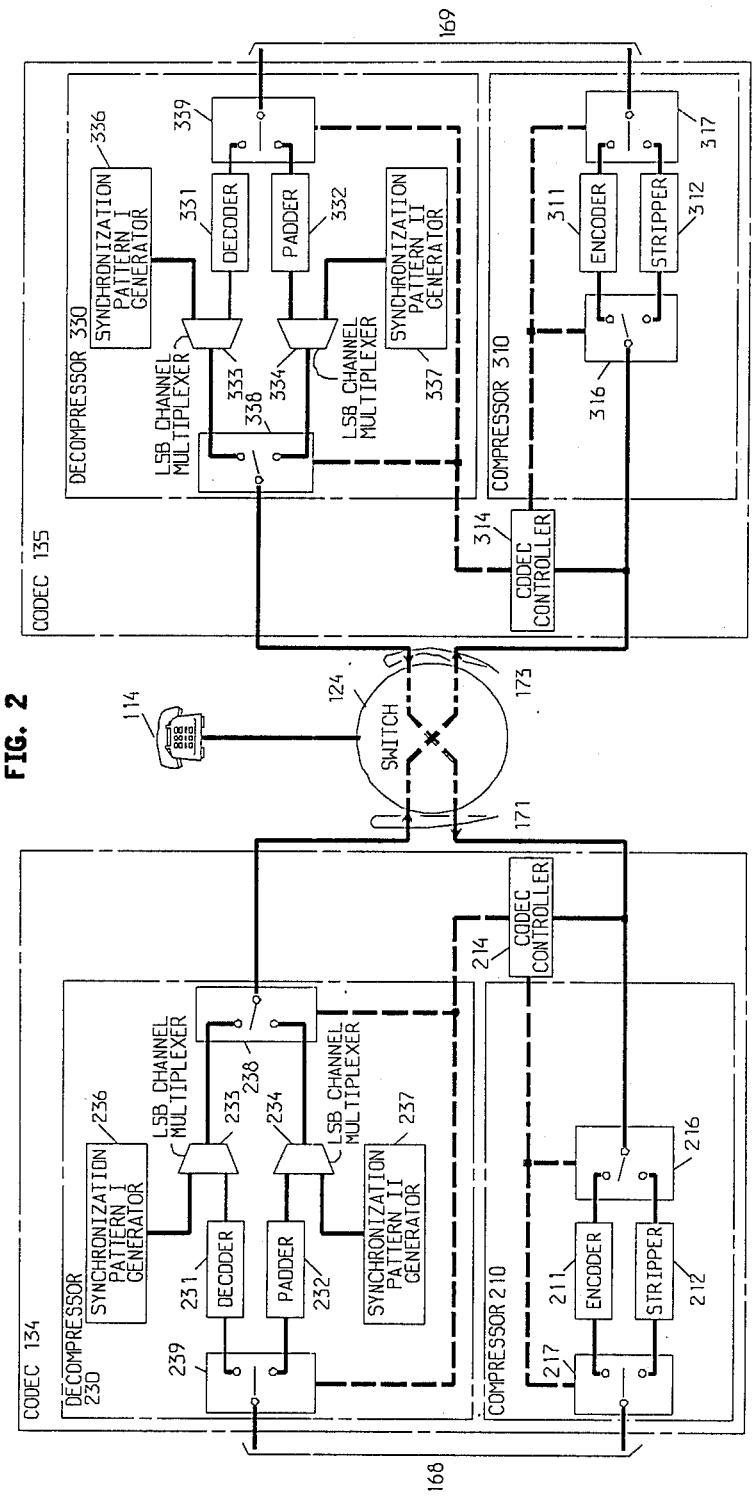
FIG. 2 shows a more detailed functional block diagram of two of the codecs of FIG. 1, interconnected with one of the PBXs and telephone stations also shown in FIG. 1.

FIG. 2 shows a more detailed functional block diagram of codecs 134 and 135 interconnected with PBX 124 and telephone 114 as in FIG. 1. Codec 134 includes a compressor 210 and decompressor 230. Compressor 210, which includes a subband encoder 211 and a stripper 212, receives a 64 kbps signal from PBX 124 on its high-bit-rate side over transmission path 169. If that signal represents 64 kbps mu-law speech, as it would if it had originated from telephone 114, it is routed by way of switch 216 to subband encoder 211, which compresses it to 16 kbps subband encoded speech. If, on the other hand, it is determined that path 169 carries a padded signal that originated from codec 135, then switch 216 routes the signal to stripper 212, which simply removes the place-holder bits therein. In either event, the resulting 16 kbps signal is output by way of switch 217, which is operated in tandem with switch 216, onto transmission path 173, the latter extending to mux/demux 142 (FIG. 1).

Decompressor 230, which includes subband decoder 231 and padder 232, receives a 16 kbps subband encoded signal from mux/demux 142 on transmission path 173. If that signal is destined for a telephone station connected directly to PBX 124, such as telephone station 114, the subband encoded signal is routed by way of switch 239 to subband decoder 231, which decodes it into a 64 kbps mu-law signal. If, on the other hand, it is determined that the signal from path 173 is destined for codec 135 (and beyond), then switch 239 routes the signal to padder 232, which appends place-holder bits to the subband coded signal in accordance with a format described below to generate a 64 kbps "padded" signal. In either event, the resulting 64 kbps signal, after passing through one or the other of LSB channel multiplexers 233 and 234, as described below, is output by way of switch 238 onto transmission path 169, the latter extending to PBX 124.

Codec 135 is substantially identical to codec 134 and need not be described in further detail except to note that the reference numbers of the various components of codec 135 begin with the digit "3" and have the same last two digits as the corresponding elements of codec 134.

Figure 3:
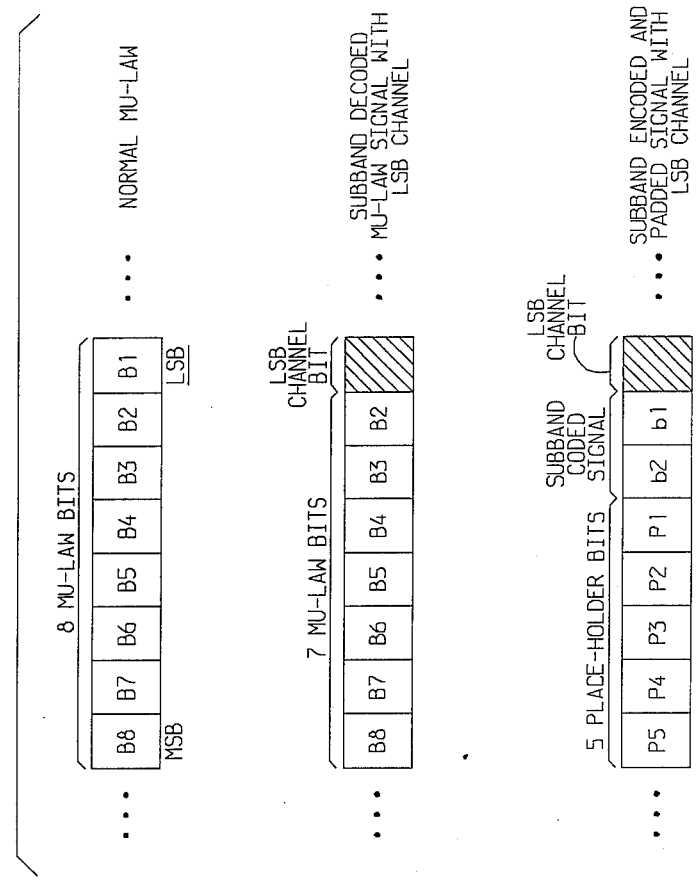
FIG. 3 shows the formats of signals used within the network of FIG. 1.

In order to explain the mechanism by which, in accordance with the invention, codecs 134 and 135 become aware of each other's presence in a connection, we now turn momentarily to FIG. 3. As shown therein, the analog voice signal initially generated in, for example, a telephone handset is sampled (either within the telephone station or the PBX) at the rate of 8,000 samples/second. Each sample is coded into a standard 8-bit mu-law-coded format (or A-law-coded format in many places outside of the United States) to provide the 64 kbps mu-law speech signal discussed above. As shown in FIG. 3, the eight bits representing each mu-law-coded sample are denoted, from least- to most-significant, as B1 through B8.

It turns out that the value of the least-significant bit (LSB) of a mu-law-coded sample carries very little speech information and, in a sense, can be specified at random with little detectable degradation to the voice signals being communicated. This is even more the case when the signals have been subjected to subband or other speech coding techniques and are then decompressed back to 8-bit length. In accordance with a feature of our invention, this fact is exploited, as further shown in FIG. 3, to provide, in effect, a supervisory signalling channel—herein referred to as the "LSB channel"—for the codecs to communicate their presence to each other. (This is not unlike the so-called "bit robbing" mechanism conventionally used in telephone transmission facilities to communicate telephone signalling information, such as on/off hook status.)

As seen from FIG. 3, the LSB channel is comprised of one bit from each 8-bit sample "frame" and illustratively occupies the position normally occupied by mu-law bit B1—this being the case both for the subband decoded signal as well as the padded signal. The latter is shown in FIG. 3 as being comprised of two subband encoded bits b1 and b2 and five place-holder bits P1–P5, as well as the one LSB channel bit. The insertion of particular signals (described below) into the LSB channel is carried out by the aforementioned LSB channel multiplexers 233 and 234 in codec 134 and multiplexers 333 and 334 in codec 135.

In preferred embodiments of the invention, a supervisory signal in the form of at least a first synchronization pattern, continuously repeated over the LSB channel, is used by each codec to manifest its presence to any other codec on its high-bit-rate side of the connection. The length of the synchronization pattern and the number of sequential repetitions that must be observed at the receiving end in order to conclude that what is being received is, indeed, the synchronization pattern originating from another codec in the connection, are chosen in such a way as to render highly unlikely the possibility that bits randomly occurring in non-codec-originated signals can appear to be the codec-originated synchronization pattern. In FIG. 2, then, codec 135, upon observing for some predetermined number of times, M, the synchronization pattern from codec 134 on transmission path 174, thereby becomes aware of the latter's presence. By the same token, codec 134 has been inserting the synchronization pattern into its own output signal extending to codec 135, thereby enabling the latter to become aware of the presence of the former.

In theory, each codec, upon becoming aware of the other's presence on its high-bit-rate side of the connection, could at that point immediately change from the subband encoding/decoding mode to the aforementioned padding/stripping mode. This may, however, create a problem in that each of the two codec will, in general, detect at different times the synchronization pattern transmitted by the other. Thus one codec may continue to subband code for a significant period of time, e.g., 1-2 seconds, after the other, although still transmitting the synchronization pattern in the LSB channel, has transitioned to the padding/stripping mode. Disadvantageously, this situation is likely to create garbled transmission at both ends of the connection during the initial seconds of the call.

This problem is avoided in accordance with a further feature of the invention by using two synchronization patterns rather than one. In particular, whenever decompressor 230 (330) is operating in a subband coding mode, a first synchronization pattern, hereinafter referred to as "Pattern I" and generated by synchronization pattern generator 236 (336), is inserted into the decompressor output signals on path 169 (174) by way of LSB channel multiplexer 233 (333). On the other hand, whenever decompressor 230 (330) is operating in a padding mode, a second synchronization pattern, hereinafter referred to as "Pattern II" and generated by synchronization pattern generator 237 (337), is inserted into the decompressor output signals by way of LSB channel multiplexer 234 (334). In addition, codecs 134 and 135 include codec controllers 214 and 314, respectively. The function of these units is to search the incoming LSB channel and to control the modes of their respective codecs as a function of which synchronization pattern is detected and when. To this end, codec controller 214 (314) controls, in tandem, switches 216 and 217 (316 and 317) in compressor 210 (310) and, again in tandem, switches 238 and 239 (338 and 339) in decompressor 230 (330).

In particular, codec controllers 214 and 314 each include a pair of pattern detectors of a conventional type. Following a conventional type of pattern detection approach, each pattern detector correlates an incoming bit stream in the LSB channel with the respective sequences of bits known a priori to comprise Patterns I and II. In response to the correlation, each pattern detector is able to detect the presence of its respective pattern in the channel even in the presence of an anticipated level of bit errors occurring therein. The particular parameters built into the detectors would take into account, for example, the bit error rate typical in the telecommunications facilities involved.

In addition, codec controllers 214 and 314 each include two state machines. One state machine in codec controller 214 (314) controls switches 216 and 217 (316 and 317) and therefore the mode of compressor 210 (310). The other state machine in codec controller 214 (314) controls switches 238 and 239 (338 and 339) and therefore the mode of decompressor 230 (330). The operation of these two state machines is embodied in state diagrams shown in FIGS. 4 and 5 respectively. Given the state diagrams, the state machines themselves can be readily designed by those skilled in the art using Boolean logic elements, flip-flops, etc.

Figure 4:
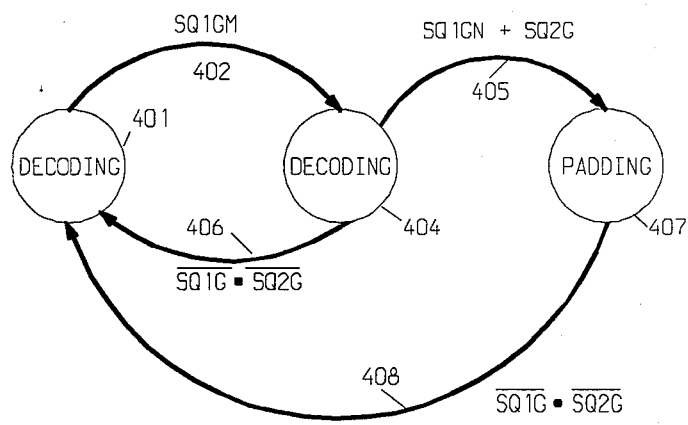
FIGS. 4 and 5 are state diagrams for codec controllers incorporated within the codecs shown in FIG. 2.
Figure 5:
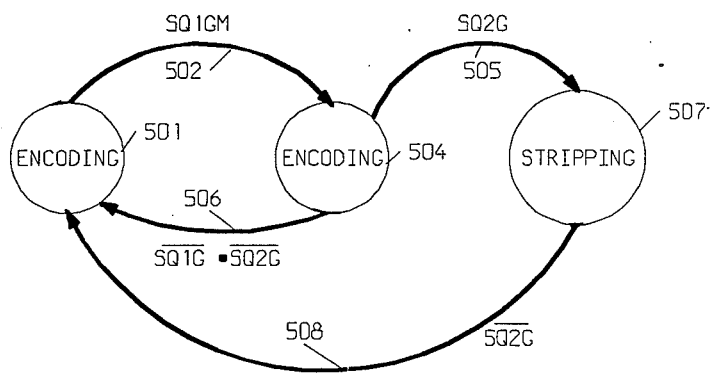

The state diagram of FIG. 4 has three states—states 401 and 404, in which a decompressor is in its subband decoding mode, and state 407, in which a decompressor is in its padding mode. The various possible transitions between these states are denoted 402, 405, 406 and 408. The state diagram of FIG. 5 similarly has three states—states 501 and 504, in which a compressor is in its subband coding mode, and state 507, in which a compressor is in its stripping mode. The transitions here are denoted 502, 505, 506 and 508. Each of the transitions in FIGS. 4 and 5 is caused by a so-called "event". The events are identified by respective mnemonics whose meanings are set forth for convenience in FIG. 6 and will become apparent as this description proceeds.

Specifically, assume that decompressors 230 and 330 are both in state 401 and compressors 210 and 310 are both in state 501. Thus, both codecs are initially operating in a subband encoding/decoding mode with switches 216, 217, 238, 239, 316, 317, 338 and 339 all being in the "up" position. Pattern I is thus being inserted into the LSB channel in both directions of transmission. Assume, further, that codec controller 314 in codec 135 detects the requisite M repetitions of Pattern I before codec controller 214 in codec 134 does. A change is not immediately made, however, to padding/stripping as in the approach suggested earlier hereinabove. Rather, codec controller 314 transitions its decompressor state machine to state 404 in which it waits for a sufficiently large number of pattern repetitions N, where N>M, to ensure that codec controller 214 in codec 134 has also detected at least the requisite M repetitions of Pattern I. Codecs 134 and 135 are thus assured to each be aware of the other's presence, in accordance with the invention, before codec 135 acts further. At the same time as it transitions its decompressor state machine to state 404, codec controller 314 transitions its compressor state machine from state 501 to state 504, the purpose of having the latter state being described hereinbelow. Upon having observed N repetitions of Pattern I, codec controller 314 changes switches 338 and 339 to the "down" position, so that decompressor 330 is transitioned to state 407 in which it begins padding. With multiplexer 334 now being in the signal path through decompressor 330, Pattern II is now what is being transmitted in the LSB channel from codec 135 to codec 134. Codec controller 314 does not, however, change the positions of switches 316 and 317 at this time. Compressor 310 thus remains in its subband encoding mode in state 504. This is appropriate since, by hypothesis, codec controller 314 was the first to detect the requisite M repetitions of Pattern I and thus the signal that codec 135 is receiving from codec 134 at this time must necessarily still be 64 kbps mu-law speech.

Meanwhile, codec controller 214 in codec 134 was also waiting to detect M repetitions of Pattern I. Indeed, because of the waiting performed within codec 135, it is assured that codec controller 214 in codec 134 will have detected M repetitions of Pattern I, and will therefore be in states 404 and 504 when Pattern II arrives. However, not having any way of determining that codec 135 was the first to detect Pattern I, codec 134 proceeds to try to wait for N repetitions of that pattern, just like codec 135 did. This will not actually happen, however, because codec 135 will have begun to transmit Pattern II. Codec controller 214, upon detection of one repetition of Pattern II during its own waiting period, transitions to states 407 and 507 by changing switches 238 and 239 to the "down" position. Accordingly, compressor 210 is transitioned from subband encoding to stripping and decompressor 230 is transitioned from subband decoding to padding. With multiplexer 234 now being in the signal path through decompressor 230, Pattern II is now what is being transmitted in the LSB channel from codec 134 to codec 135.

The purpose of having a state 504 in the compressor state machine can now be explained. In particular, it is important that a transition be made to the stripping mode in state 507 as soon as a single repetition of Pattern II is detected. This is so because the arrival of Pattern II means that codec 134 is now receiving a padded signal and, unless compressor 210 is changed to its stripping mode at that time, a garbled signal will be output onto transmission path 173. By the same token, however, there needs to be some assurance that the received signal is, indeed, a padded signal whereas there is some probability that a single repetition of the bits comprising Pattern II may occur randomly in a nonpadded, i.e., standard mu-law coded, signal originating from, for example, telephone station 114. However, by requiring that M repetition of Pattern I are detected before acting in response to a single repetition of Pattern II, i.e., by having a state 504 which is intermediate to states 501 and 507, it is ensured that when bits appearing to be a single repetition of codec-originated Pattern II are detected, they, in fact, did originate from codec 135.

In view of the foregoing, it will be appreciated that compressor 310 in codec 135 is the only unit still in its original mode, i.e., subband encoding in state 504. However, once codec controller 314 detects Pattern II now being transmitted from codec 134, it transitions to state 507, in which switches 316 and 317 are in the "down" position and compressor 310 is therefore in the stripping mode.

Finally, once PBX 124 "tears down" the connection between codecs 134 and 135 upon completion of the call, the synchronization patterns being received by those codecs in transmission paths 169 and 174 disappear. This causes both the compressor and decompressor state machines of both codec controllers 214 and 314 to transition to their original states 401 and 501. It may also be noted that any synchronization pattern disappearance occurring while the codec controllers are in states 404 or 504 will similarly result in a return to states 401 and 501.

Returning, now, to FIG. 1, a further issue relating to the LSB channel will now be addressed. In particular, T1 mux/demuxes 144, 146, 147 and 148 communicate telephone signalling information, such as on/off hook status, by "robbing" the least-significant bit of every sixth mu-law coded sample communicated across T1 links 163 and 165. There is no synchronization between such T1 links. Therefore, in the worst case, two out of every six 8-bit sample frames may have their least-significant bit altered by the T1 mux/demuxes in the process of conveying this signalling information. Disadvantageously, then, one-third of the LSB channel bits in any connection between codecs 134 and 137 have the potential for being corrupted. This problem is advantageously dealt with by so arranging the synchronization pattern generators within the codecs, such as 236 and 237 in codec 134, that each bit of each of Patterns I and II is repeated six times in succession before proceeding to the next bit in the pattern. Thus, as long as the LSB channel passes through no more than five T1 links, the LSB channel intelligence is guaranteed to survive the multiple bit-robbings occurring therein. It simply remains to so design the synchronization pattern detectors within codec controllers 214 and 314 in a straightforward way to search for the synchronization pattern in every sixth sample in each of six possible LSB time slots.

Currently speech coding is being considered for use in digital mobile cellular radio applications in order to most efficiently use the available radio bandwidth. To this end, such systems will use codecs similar to those traditionally used in land-based telecommunications environments such as the PBX environment described hereinabove. Indeed, the same problem of multiple encoding/decoding cycles can also arise in the digital cellular environment—especially in a mobile-station-to-mobile-station connection.

Figure 7:
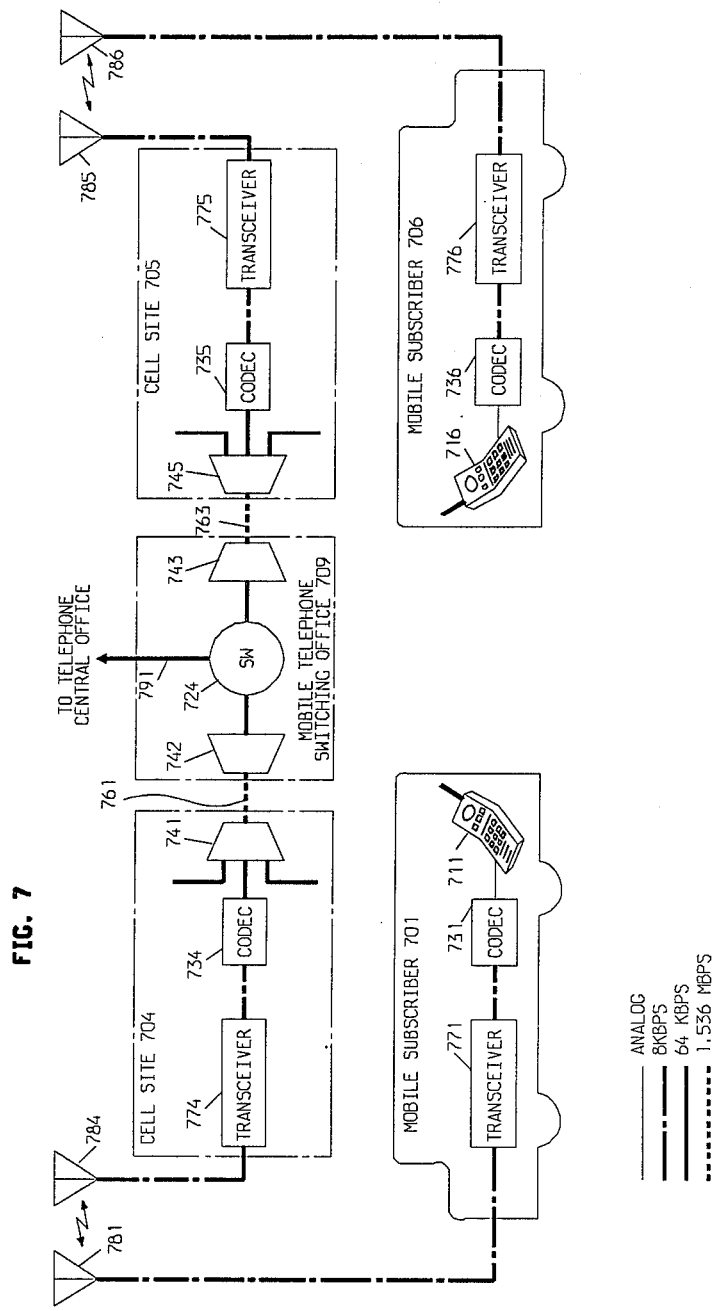
FIG. 7 depicts a cellular mobile radio system in which the present invention is illustratively implemented.

This is illustrated in FIG. 7 which depicts a portion of a cellular mobile radio system in which the invention can also be used to advantage. In this system, a mobile subscriber 701 generates a modulated speech coded radio signal which is communicated to a second mobile subscriber 706 by way of mobile telephone cell site 704, mobile telephone switching office 709, and mobile telephone cell site 705. Mobile station 706 communicates with mobile subscriber 701 via the reverse path. Communications between mobile subscriber 701 (706) and cell site 704 (705) is accomplished by a radio transmission link which includes antennas 781 and 784 (785 and 786). Communications between cell site 704 (705) and switching office 709 is accomplished by terrestrial T1 link 761 (763) which interconnects multiplexer 741 (745) within cell site 704 (705) with multiplexer 742 (743) within switching office 709.

Mobile subscriber 701 includes telephone handset 711, speech codec 731, and transceiver 771. Codec 731 samples the analog speech signal received from handset 711 at 8000 samples/sec and, using a predetermined speech coding algorithm, encodes it at a rate of (illustratively) 8 kbps. The resulting signal is then modulated by transceiver 771 into a pre-assigned outgoing mobile telecommunications radio channel and applied to antenna 781. Conversely, modulated coded speech signals within a pre-assigned incoming mobile telecommunications radio channel received by antenna 781 are demodulated by transceiver 771, decoded by codec 731 and applied in analog form to handset 711.

Mobile subscriber 706 similarly includes handset 716, codec 736, and modulator/demodulator 776 which operates similarly to the corresponding components of mobile subscriber 701.

Cell site 704 includes transceiver 774, codec 734 and multiplexer 741. Transceiver 774 operates in a manner complementary to transceiver 771. Moreover codec 734, when part of a connection extending through multiplexers 741 and 742 and digital switch 724 of switching office 709 to a non-mobile telephone central office via trunk 791, operates in a manner complementary to codec 731.

Similarly, cell site 705 includes transceiver 775, codec 735 and multiplexer 745. Transceiver 775 operates in a manner complementary to transceiver 776. Moreover codec 735 when part of a connection extending through multiplexers 745 and 743 and switch 724 to trunk 791 operates in a manner complementary to codec 736.

Codecs 734 and 735 are, however, similar to codecs 134 and 135 of FIG. 1 in the sense that, upon recognizing each others' presence in a connection in accordance with the invention, they transition to a padding/stripping mode. Advantageously, then, the distortion and delay that would otherwise be occasioned by the carrying out of two encoding/decoding cycles is avoided in this cellular mobile radio system just as in the network of FIG. 1.

The foregoing merely illustrates the principles of the invention. For example, although the invention is shown and described herein in the context of a PBX network and a digital cellular radio system, other applications will be apparent to those skilled in the art. Indeed, although the intelligence represented by the signals generated by the codecs disclosed herein is illustratively human speech, the invention is equally applicable to codecs which generate signals representing other forms of intelligence.

In addition, the coding that is performed in the codecs is not limited to a type of coding whose objects is to reduce the bit rate of the signal being coded. Encryption and modulation are but two other examples of types of coding that codecs embodying the invention might employ.

Moreover, it will of course be appreciated that the various parameters set forth herein, such as bit rates, are merely illustrative.

In addition, although a particular mechanism has been disclosed to enable a codec in a connection to detect the presence of another codec in that connection on its high-bit-rate side, other mechanisms that achieve this function may be devised.

Moreover, although the drawing shows various functional elements, such as the elements of codecs 134 and 135, as discrete functional blocks, the functions thereof could be performed by one or more appropriately programmed processors, signal processing chips, etc.

It will thus be appreciated that those skilled in the art will be able to devise numerous arrangements which, although not explicitly shown or described herein, embody the principles of the invention and are within its spirit and scope.

What is claimed is:

1. A codec having a capability of decoding a coded digital input signal into a decoded digital output signal, for use in a system in which said codec is connected to receive said coded digital input signal and is further connected to a communication endpoint via a transmission path, said communication endpoint for receiving intelligence in decoded form and said codec being adapted to generate an output digital signal destined for said communication endpoint in response to said coded digital input signal, said output signal representing said intelligence to be received by said endpoint and said coded digital input signal representing said intelligence in coded form, said codec comprising, first means for forming a determination as to whether said transmission path includes means for decoding a signal representing said intelligence in said coded form into a signal representing said intelligence in said decoded form, second means operative when said determination is that said path does not include said means for decoding, for decoding said coded digital input signal into said decoded digital output signal, said decoded digital output signal representing said intelligence in decoded form, and third means operative when said determination is that said path does include said means for decoding, for generating as said digital output signal a signal in which said coded digital input signal is embedded.

2. The invention of claim 1 wherein said codec further includes means for receiving from said path a second input signal, said second input signal representing intelligence originating from said endpoint, and wherein said means for forming forms a determination that said path includes a means for decoding said first output signal in response to the presence in said second input signal of a predefined supervisory signal.

3. The invention of claim 2 wherein said codec further includes means for including within said output signal a supervisory signal indicative of the presence of said codec.

4. The invention of claim 2 wherein said input and output signals are at first and second bit rates, said first bit rate being less than said second bit rate and wherein said third means generates said output signal by adding place-holder bits to said input signal.

5. The invention of claim 4 wherein individual ones of said place-holder bits comprise a supervisory signal indicative of the presence of said codec.

6. A codec having a capability of coding an uncoded digital input signal into a coded digital output signal, for use in a system in which said codec is connected to transmit said coded digital output signal and is further connected to a communication endpoint via a reception path, said communication endpoint for originating intelligence in decoded form and said codec being adapted to generate said coded digital output signal in response to a digital input signal received over said reception path, said input signal representing said intelligence originating from said communication endpoint and said coded digital output signal representing said intelligence in coded form, said codec comprising.

first means for forming a determination as to whether said input signal has embedded therein said intelligence in said coded form, second means operative when said determination is that said input signal does not have embedded therein said intelligence in said coded form, for coding said input signal into said coded digital and third means operative when said determination is that said input signal does have embedded therein said intelligence in said coded form, for generating as said coded digital output signal the portion of said input signal comprising said embedded intelligence in said coded form.

7. The invention of claim 6 wherein said means for forming forms a determination that said input signal has embedded therein a coded version of said intelligence in response to the presence in said input signal of a predefined supervisory signal.

8. A codec having a capability of decoding a coded input signal into a decoded output signal and a capability of encoding a decoded input signal into a coded output signal, for use in a system in which said codec is connected to first and second communication endpoints via first and second transmission paths, respectively, said codec being adapted to generate first and second digital output signals in response to first and second digital input signals, respectively, said first and second input signals representing intelligence originating in decoded form from said first and second communication endpoints, respectively, said first and second output signals representing intelligence destined for receipt in decoded form by said second and first communication endpoints, respectively, and said first input and second output signals respectively representing the intelligence represented by said first output and second input signals in coded form, said codec comprising, first means for forming a determination as to whether said second transmission path includes both a means for decoding said first output signal and a means for embedding in said second input signal a coded version of the intelligence originating from said second endpoint, second means operative in response to a negative such determination for generating as said first output signal a decoded version of the intelligence represented by said first input signal and for generating as said second output signal a coded version of the intelligence represented by said second input signal, and third means operative in response to a positive such determination for generating as said first output signal a signal in which said first input signal is embedded and for generating as said second output signal the portion of said second input signal comprising said embedded coded version of the intelligence originating from said second endpoint.

9. The invention of claim 8 wherein said first input and second output signals are at a first bit rate and said first output and second input signals are at a second bit rate greater than said first bit rate, and wherein said third means generates said first output signal by adding place-holder bits to said first input signal and generates said second output signal by stripping place-holder bits from said second input signal.

10. The invention of claim 8 wherein said means for forming forms said determination as a function of the presence or absence in said second input signal of a predefined supervisory signal.

11. A codec adapted to generate first and second digital output signals in response to first and second digital input signals, respectively, said first input signal being comprised of bits at a first bit rate representing encoded speech originating from a communication endpoint, said second output signal being comprised of a second sequence of bits at said first bit rate representing encoded speech destined for said communication endpoint, said first output and second input signals being comprised of respective sequences of multi-bit words occurring at a second bit rate greater than said first bit rate, said codec comprising means initially operative for generating as said first output signal a decoded version of said first input signal and for generating as said second output signal an encoded version of said second input signal, said decoded version including a first synchronization pattern, means operative for thereafter generating as said first output signal a signal which includes bits from said first input signal and bits representing a second synchronization pattern, the operation of this means being initiated in response to the presence in said second input signal of the first occurring of (a) first and second predetermined intervals of said first synchronization pattern and (b) said first predetermined interval of said first synchronization pattern followed by a second synchronization pattern, and means operative in response to the presence of said second synchronization pattern in said second input signal for thereafter generating as said second output signal a signal comprised of the bits in predetermined bit locations in each successive word of said second input signal.

12. In combination in a telecommunications connection, a first codec, a second codec, said first and second codecs each having a capability of decoding a coded input signal into a decoded output signal and a capability of encoding a decoded input signal into a coded output signal, said first and second codecs each being adapted to generate respective first and second digital output signals in response to first and second digital input signals, respectively, the first input signals of said first and second codecs representing in coded form intelligence originating in uncoded form from first and second communication endpoints, respectively, the second output signals of said first and second codecs representing intelligence in coded form destined for receipt in uncoded form by said first and second communication endpoints, respectively, the first output signals of said first and second codecs being the second input signals of said second and first codecs, respectively, each said codec comprising means for inserting a supervisory signal into the first output signal of said each codec, means for detecting the presence of said supervisory signal in said second input signal of said each codec, and means operative only if said supervisory signal has been detected for generating as said first output signal of said each codec a signal in a predetermined format in which the first input signal of said each codec is embedded and for generating as said second output signal the portion of said second input signal of said each codec comprising the coded intelligence embedded therein.

13. A method for use in a codec having a capability of decoding a coded digital input signal into a decoded digital output signal, in a system in which said codec is connected to receive said coded digital input signal and is further connected to a communication endpoint via a transmission path, said communication endpoint for receiving intelligence in decoded form and said codec being adapted to generate an output digital signal destined for said communication endpoint in response to said coded digital input signal, said output signal representing said intelligence to be received by said endpoint and said coded digital input signal representing said intelligence in coded form, said method comprising the steps of, forming a determination as to whether said transmission path includes means for decoding a signal representing said intelligence in said coded form into a signal representing said intelligence in said decoded form, decoding said coded digital input signal into said decoded digital output signal, said decoded digital output signal representing said intelligence in decoded form, when said determination is that said path does not include said means for decoding, and generating as said digital output signal a signal in which said coded digital input signal is embedded, when said determination is that said path does include said means for decoding.

14. The invention of claim 13 wherein said codec further includes means for receiving from said path a second input signal, said second input signal representing intelligence originating from said endpoint, and wherein in said forming step a determination is formed that said means for forming forms a determination that said path includes a means for decoding said first output signal in response to the presence in said second input signal of a predefined supervisory signal.

15. The invention of claim 14 wherein in each of said generating steps a supervisory signal indicative of the presence of said codec is included within said output signal.

16. The invention of claim 14 wherein said input and output signals are at first and second bit rates, said first bit rate being less than said second bit rate and wherein in the second of said generating steps said output signal is generated by adding place-holder bits to said input signal.

17. The invention of claim 16 wherein individual ones of said place-holder bits comprise a supervisory signal indicative of the presence of said codec.

18. A method for use in a codec having a capability of coding an uncoded digital input signal into a coded digital output signal, used in a system in which said codec is connected to transmit said coded digital output signal and is further connected to a communication endpoint via a reception path, said communication endpoint for originating intelligence in uncoded form and said codec being adapted to generate said coded digital output signal in response to a digital input signal received over said reception path, said input signal representing said intelligence originating from said communication endpoint and said coded digital output signal representing said intelligence in coded form, said method comprising the steps of, forming a determination as to whether said input signal has embedded therein said intelligence in said coded form, coding said input signal into said coded digital output signal, when said determination is that said input signal does not have embedded therein said intelligence in said coded form, and generating as said coded digital output signal the portion of said input signal comprising said embedded coded version, when said determination is that said input signal does have embedded therein said intelligence in said coded form.

19. The invention of claim 18 wherein in said forming step a determination that said input signal has embedded therein a coded version of said intelligence is formed in response to the presence in said input signal of a predefined supervisory signal.

20. A method for use in a codec adapted to generate first and second digital output signals in response to first and second digital input signals, respectively, said first input signal being comprised of bits at a first bit rate representing encoded speech originating from a communication endpoint, said second output signal being comprised of a second sequence of bits at said first bit rate representing encoded speech destined for said communication endpoint, said first output and second input signals being comprised of respective sequences of multi-bit words occurring at a second bit rate greater than said first bit rate, said method comprising the steps of initially generating as said first output signal a decoded version of said first input signal and initially generating as said second output signal an encoded version of said second input signal, said decoded version including a first synchronization pattern, thereafter generating as said first output signal a signal which includes bits from said first input signal and bits representing said second synchronization pattern, this generating step being initiated in response to the presence in said second input signal of the first occurring of (a) first and second predetermined intervals of said first synchronization pattern and (b) said first predetermined interval of said first synchronization pattern followed by a second synchronization pattern, and thereafter generating as said second output signal a signal comprised of the bits in the bit locations in each successive word of said second input signal which correspond to said predetermined bit locations of said first output signal, this generating step being initiated in response to the presence of said second synchronization pattern in said second input signal.

21. A codec having a capability of converting a received coded input signal into a decoded output signal, comprising:

first means when activated for converting the received coded input signal into the decoded output signal for transmission via a path to a destination for receiving the decoded output signal;

second means when activated for embedding the received coded input signal in a carrying output signal for transmission via the path to the destination;

third means for determining whether the path includes conversion means for converting a coded signal into the decoded output signal; and fourth means responsive to a determination that the path includes the conversion means, for activating the second means and inactivating the first means, and otherwise for activating the first means and inactivating the second means.

22. The codec of claim 21 wherein
the third means comprise
means for determining whether the path includes means for extracting the embedded coded input signal from the carrying output signal, the inclusion of the extracting means indicating the inclusion of the conversion means.

23. The codec of claim 21 wherein
the third means comprise
means for detecting receipt via the path of a predetermined signal indicative of the inclusion.

24. The codec of claim 21 wherein
the coded input signal is receivable from a second codec which forms a tandem pair with the aforementioned codec.

25. A codec having a capability of converting a received uncoded input signal into a coded output signal, comprising:

first means when activated for converting the received uncoded input signal into the coded output signal, the uncoded input signal having been received via a path from a source for transmitting the uncoded input signal;

second means when activated for extracting the coded output signal from a carrying input signal in which the coded output signal is embedded, the carrying input signal having been received via the path from the source;

third means for determining whether the path includes conversion means for converting the uncoded input signal into a coded signal; and fourth means responsive to a determination that the path includes the conversion means, for activating the second means and inactivating the first means, and otherwise for activating the first means and inactivating the second means.

26. The codec of claim 25 wherein
the third means comprise
means for determining whether the path includes means for embedding the coded output signal in the carrying input signal, the inclusion of the embedding means indicating the inclusion of the converting means.

27. The codec of claim 25 wherein
the third means comprise means for detecting receipt via the path of a predetermined signal indicative of the inclusion.

28. The codec of claim 25 wherein
the coded output signal is for transmission to a second codec which forms a tandem pair with the aforementioned codec.

* * * * *